Nov. 5, 1968    M. J. SCHOEBEN    3,408,831
SHOCK-DAMPENING SHAFT COUPLING
Filed June 23, 1967
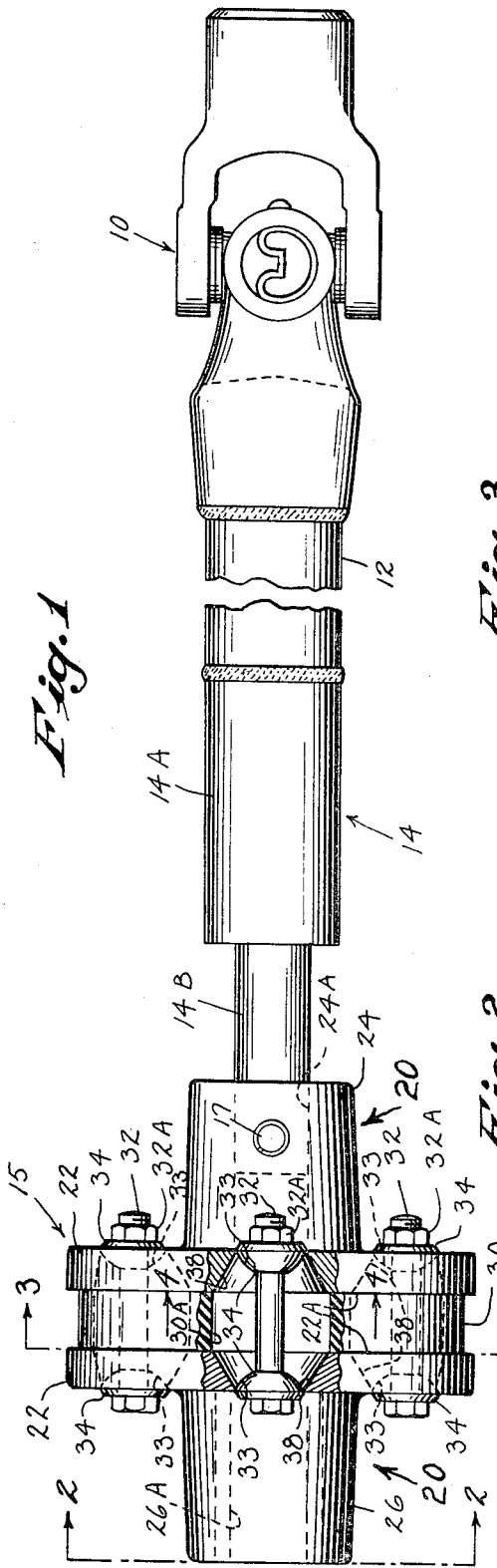
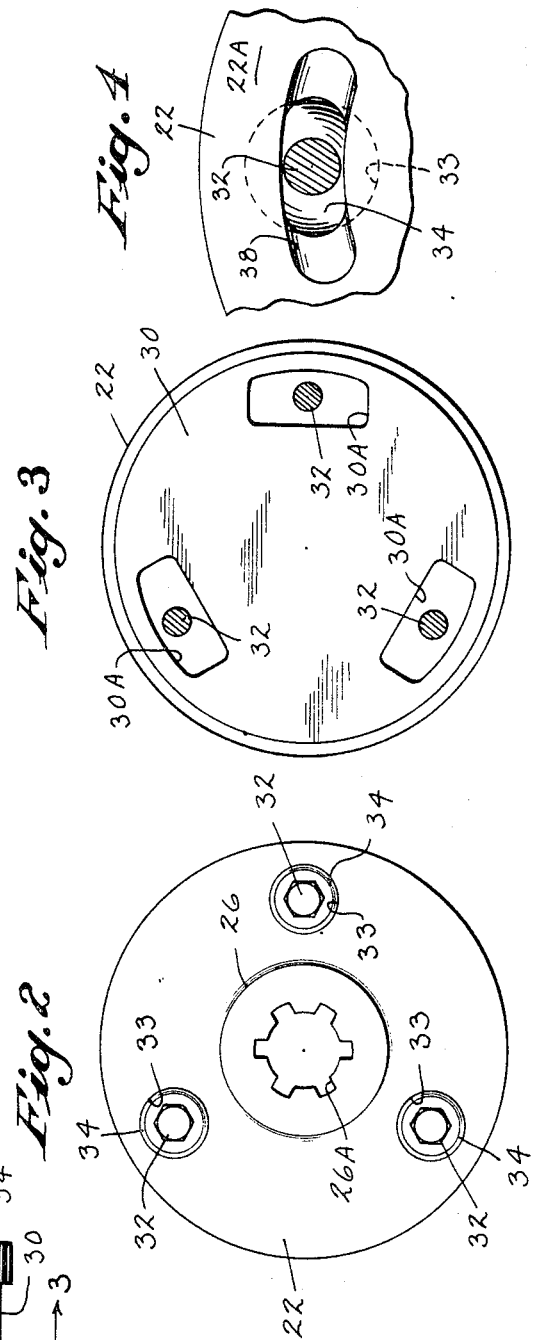
INVENTOR
MICHAEL J. SCHOEBEN
BY
ATTORNEY

United States Patent Office 3,408,831
Patented Nov. 5, 1968

3,408,831
SHOCK-DAMPENING SHAFT COUPLING
Michael J. Schoeben, Homewood, Ill., assignor to Rex Chainbelt Inc., Milwaukee, Wis., a corporation of Wisconsin
Filed June 23, 1967, Ser. No. 648,254
9 Claims. (Cl. 64—27)

ABSTRACT OF THE DISCLOSURE

A shock-dampening shaft coupling having a pre-compressed elastomer member disposed between a pair of spaced discs. The discs are connected together by a series of equally spaced rigid tension bolts having universal connection with the discs to allow angulation of the bolts as the coupling "winds up" upon the application of torque.

---

The present invention relates generally to shock-dampening shaft couplings and more particularly to a shock dampener employing an elastomer element and being capable of absorbing axial and/or torsional shock loads, the dampener having particular utility in shafting arrangements including universal joints.

Flexible mechanical drive lines are ofttimes utilized in industry; moreover, in agricultural applications, where a tractor or other prime mover provides operating power to a drawn implement, the common means of connection is from a power take-off on the tractor to the drive mechanism of the implement via a drive line or shafting system including at least a pair of universal joints and a telescoping shaft portion. Agricultural implement operation inherently involves the imposition of irregular loading on the implement drive mechanism, which irregular loading ofttimes reaches shock proportions in the shafting system. Furthermore, the use of universal joints in flexible shafting results in vibrations under certain conditions, thereby imposing additional inordinate loading on the shafting and connected machinery. The imposition of such irregular and inordinate forces on the shafting system obviously dictates design requirements exceeding those that would otherwise be applicable; moreover, the transmittal of these forces to the connected drive motors or driven devices can also cause serious damage to these units as well as to the elements of the shafting system itself. Accordingly, the need and desirability of having shock absorbing capability in the shafting system has been recognized, and many devices have been proposed to nullify the deleterious effects of the above described severe loading conditions. The conditions encountered normally involve linear (usually axial) as well as rotational (torsional) shock loads, and this combination has proven to be specifically difficult to deal with since most shock absorbing mechanisms are designed for handling severe loads in one direction only.

According it is an object of the present invention to provide, for use in rotational power transmitting drive shaft systems, a device for effectively minimizing the effects of peak or shock loads, of the axial and/or torsional types, imposed on such systems. More specifically it is an object that this device be simple in operation and design, easy to install and maintain, compact, inexpensive, and capable of effectiveness under a wide variety of shock load conditions.

These and other objects are attained according to the present invention, in which there is provided a shock-dampening shaft coupling comprising essentially a pair of spaced discs having an elastomer element interposed therebetween. The discs are arranged for connection to axially extending driver and driven shafts. A plurality of circumferentially equally spaced rigid tension members interconnect the discs, each tension member having at each and a limitedly universal connection with the respective disc to thereby allow limited rotation of either discs relative to the other. The tension members are parallel to the disc axes in the non-load transmitting condition; moreover, the effective length of the tension members is adjusted to effect precompression of the elastomer element between the discs. The size and stiffness of the elastomer element is such that the application of torque to one of the coupling discs in either direction effects rotation of that coupling disc relative to the other, with consequent angulation of the tension members and further compression of the elastomer element, whereby at least a substantial portion of the applied torque is absorbed and temporarily stored in the elastomer element as shear and compression forces.

These and other objects and advantages will appear in the following detailed description of the invention having reference to the accompanying drawings in which:

FIGURE 1 is a side view of a shafting arrangement having incorporated therein a shock dampener according to the present invention;

FIG. 2 is an end view taken along line 2—2 of FIGURE 1;

FIG. 3 is a sectional view taken along line 3—3 of FIGURE 1; and

FIG. 4 is a partial view taken along line 4—4 of FIGURE 1.

Referring to FIGURE 1, the depicted shaft arrangement includes a universal joint 10 (which may be connected at its right end to a drive shaft) connected by welding to a tubular shaft 12, which is in turn connected by welding at its opposite end to the female portion 14A of a slip sleeve 14. The portion 14A is formed with an axially extending opening of square cross-section, into which is slidably received a square shaft 14B constituting the male portion of the slip sleeve 14. The opposite end of the shaft 14B is rigidly connected with the shock dampening coupling 15, the details of which are discussed hereinafter with further reference to FIGS. 2 through 4.

The shock-dampening coupling 15 includes a pair of flange members 20, each having identical disc portions 22 having spaced parallel surfaces 22A. The right hand flange member 20 includes a hub portion 24 having axially formed therein a square opening 24A arranged to receive the end of the aforementioned square shaft 14B, the pin member 17 being provided to rigidly secure the shaft 14B to the hub portion 24. The left hand flange member 20 includes a hub portion 26 having axially formed therein an opening 26A arranged to receive a splined shaft (not shown). It should be appreciated that the particular shaft connections shown are merely illustrative, as is the specific arrangement of the components in the embodiment shown. Also, it should be appreciated that multiple universal joints are usually employed in shafting systems.

A circular elastomer element 30 is disposed between and frictionally engaged but not bonded with the disc surfaces 22A. A series of circumferentially equally spaced rigid tension members or bolts 32 interconnect the disc portions 22 of the flange members 20, the tension members 32 being arranged so that their axes are parallel with the discs common to the flange members 20 when the coupling 15 is not transmitting any load. Each bolt 32 has a lock nut 32A threaded to the end thereof. The ends of each bolt 32 are arranged with ball-and-socket type joints to afford limited universal movement of the discs 22 so that relative rotation of the discs 22 is possible. The connections allowing this movement include hemispherical depressions 33 formed in the outer faces of the discs 22, with pivot washers 34 having mating hemispherical inner surfaces at both ends of each bolt 32. One of the hemispherical bearing surfaces is so treated (as by oil impregnation, sintering, nylon coating, etc.) as to render the ball-and-socket type joint self-lubricating, thus avoiding any use of applied lubricant in the immediate vicinity of the elastomer element 30. As best shown in FIG. 4, the bolt holes 38 through the disc 22 diverge outwardly in the circumferential direction along the bolt circle of the bolts 32 (i.e., the bolt hole openings 38 are circumferentially elongated on the inner faces 22A of the discs 22) so that the desirable angulation of the bolts can be accommodated. It should also be noted that the bolt holes 38 are formed to allow limited pivotal movement of the bolts 32 in the radial planes of the discs 22. The elastomer element 30 is also provided with circumferentially elongated openings 30A to allow angulation of the bolts 32 and to preclude damage to the elastomer element 30 due to contact with the bolts 32.

The above described coupling 15 is extremely simple in design, and accordingly is quite inexpensive; moreover, it requires a minimum of shaft length for installation, is compact, and has a smooth outer surface so as not to present a hazardous condition upon rotation. Assembly of the unit is likewise simple and may be accomplished in a very short period of time without the benefit of any tools other than a pair of wrenches; moreover, the characteristics of the elastomer element 30 are such that shaft alignment is not critical. Assembly of the unit is accomplished by arranging the elastomer element 30 and the flange members 20 so that the bolt holes 38 and elastomer openings 30B are aligned. Next the bolts 32, pivot washers 34 and lock nuts 32A are assembled as shown in FIGURE 1. The nuts 32A are then tightened to provide the necessary degree of precompression of the elastomer element 30. A suitable amount of precompression of the elastomer element 30 assures maximum fatigue life of the element 30, since the precompression precludes any portion of the element 30 from approaching and/or passing through the zero strain condition during operation. In addition, the precompression assures the frictional engagement between the element 30 and the disc surfaces 22A so as to avoid slippage, and causes an effective seal precluding the ingress of foreign matter between the elastomer element 30 and discs 22.

The coupling 15 is extremely versatile as regards the types of loading that can be absorbed and diluted. Upon start-up of the connected machinery, the initial torque surge will cause the driving flange member 20 to rotate relative to the driven member 20, with consequent angulation of the tension members 32 and absorption of the initial torque surge in the elastomer element 30 in the form of shear and compression forces. During steady load operation the tension members 32 will remain angulated to an extent dependent on the amount of torque being transmitted through the elastomer element. Upon the relaxation of any torque loading, the energy stored in the elastomer element 30 will tend to restore the unit to its starting condition. Any axial loading on the coupling 15 is accommodated by the elastomer element 30 in compression. Thus it will be appreciated that axial and torsional loadings in all combinations will be effectively damped by the coupling 15. It should further be noted that the coupling 15 is not subject to failure upon the application of a shock load far in excess of the loads intended to be damped. In the event of the imposition of an extremely severe shock, maximum angulation of the rigid tension members 32 (as limited by the physical boundaries of the bolt holes 38) will occur, after which the further imposition of load will be transferred directly between the flange members 20 by way of the tension members 32. Thus, the ultimate strength of the coupling 15 is not limited by the physical properties of the elastomer element 30.

As mentioned above, the subject coupling 15 has particular utility in shafting systems including universal joints and telescoping shafts. In such a system, as the shaft length is being changed due to a change in drive angle, a considerable axial force (dependent upon the amount of torque being transmitted) is imposed on the shaft due to the sliding of the telescoping parts. As discussed above the coupling 15 can readily accommodate this combination of axial and torsional forces along with accompanying shock loads. The situation may arise however, where the telescopic action may impose a non-axial component of linear force on the coupling 15. In this respect, it should be particularly noted that the alignment of the elastomer element 30 and the flange members 20 will not be affected by such a non-axial force even though there is no apparent resistance thereto, there being no rigid axial guide connecting the flange members 20. The construction of the unit is such that it is readily flexible when the tension members 32 are in parallel relation with the axes of the flange members 20; however, when three or more tension members 32 are employed, as the angulation of the tension members 32 increases (due to the imposition of high torque loads, for example), the resistance of the flange members to movement (and particularly to canting) with respect to each other increases. Thus, the unit tends to transfer any non-axial linear loads without material affect on its alignment and without altering its ability to accommodate axial and torsional loading. Recognizing the normal operation of a shafting system employing universal joints and telescoping shaft means, it will be appreciated that the non-axial linear forces due to telescopic movement increase in proportion to the torque loading. Since angulation of the tension members 32 (and therefore stabilization of the coupling 15) also increases with torque loading, as the condition becomes more severe, the balance of forces within the unit is such that the coupling 15 inherently possesses correspondingly greater ability to transfer the condition with affect.

Quite obviously, the size and type of material used for the elastomer element 30 can be varied to obtain different degrees of "softness" of the coupling 15. By way of example, and not limitation, a coupling utilizing a ¾ inch thick neoprene element of six inch outside diameter #45 durometer hardness has been tested on agricultural implement drive applications with considerable success as to its ability to dilute torsional and axial peak loads.

The foregoing description of the invention and of the manner and process of making and using it sets forth the best mode or modes of carrying out the invention as presently contemplated. The following claim or claims particularly point out and distinctly claim the subject matter which is regarded as the invention.

What is claimed is:

1. A shock-dampening shaft coupling for absorbing axial and rotation shock loads comprising a pair of spaced coaxial discs having opposed surfaces, said discs having shaft connecting means extending axially therefrom, a plurality of circumferentially equally spaced rigid tension members interconnecting said discs, each tension member having at each end a limitedly universal connection with the respective disc to allow limited rotation of one disc relative to the other, and an elastomer element disposed between and frictionally engaged with the opposed disc surfaces, said tension members being parallel with the discs axis and having an effective length such as to effect precompression of the elastomer element between the discs when the coupling is in the non-load transmitting condition, the size and stiffness of the elastomer element being such that the application of torque in either direction to one of said discs effects rotation of that disc relative to the other disc with consequent angulation of the tension members and further compression of the elastomer element, at least a substantial portion of the energy of the applied torque being absorbed and temporarily stored in the elastomer element as shear and compression forces.

2. The invention of claim 1 wherein the degree of precompression of the elastomer element is such that all portions of said element are in compression under all conditions of operation.

3. The invention of claim 1 wherein the tension members pass through circumferentially elongated openings formed in the elastomer element.

4. The invention of claim 3 wherein the tension members are connected with the outer surfaces of the discs, and the inner surfaces of the discs are formed with circumferentially elongated recesses to allow angulation of the tension members.

5. The invention of claim 4 wherein the connections between the tension member ends and the discs are self-lubricated ball-and-socket joints.

6. The invention of claim 5 wherein the opposed surfaces of the discs are parallel and the elastomer element is of approximately the same outside diameter as the discs.

7. The coupling of claim 1 in combination with a universal joint, and telescopically sliding means for accommodating changes in shaft length, said coupling having at least three tension members, the characteristics of the elastomer element in compression being such that the angulation of the tension members under any given condition of torque transmission is sufficient to preclude any substantial misalignment of the discs due to non-axial linear forces generated in said telescopic sliding means, whereby the elastomer element and discs are self-centering due to the balance of forces within the unit.

8. The invention of claim 7 wherein the tension members of the coupling pass through circumferentially elongated openings formed in the elastomer element, and the inner surfaces of the discs are formed with circumferentially elongated depressions adjacent said openings.

9. The invention of claim 8 wherein the tension members are connected with the outer surfaces of the discs, said discs having hemispherical bearing depressions formed therein, said tension members including hemispherical washers mating with said depressions.

References Cited

UNITED STATES PATENTS

| 249,325 | 11/1881 | Edwards | 192—54 X |
| 2,140,255 | 12/1938 | Rieske | 64—27 |
| 3,100,974 | 8/1963 | Wilson et al. | 64—30 |
| 3,199,315 | 10/1965 | Morse | 64—30 X |

FOREIGN PATENTS

| 2,487 | 1/1884 | Great Britain. |

HALL C. COE, *Primary Examiner.*